T. N. KIRKHAM, D. HULETT, S. CHANDLER, Sr.,
& S. CHANDLER, Jr.
Apparatus for Condensing, Washing, and Purifying
Gas and Other Vapors.

No. 206,736. Patented Aug. 6, 1878.

Attest.
Geo. T. Smallwood Jr.
Walter Allen

Inventors:
Thomas Nishan Kirkham
David Hulett
Samuel Chandler Senr.
Samuel Chandler Junr.
By Knight Bros. attys

UNITED STATES PATENT OFFICE.

THOMAS N. KIRKHAM, OF WESTMINSTER, DAVID HULETT, OF LONDON, AND SAMUEL CHANDLER, SR., AND SAMUEL CHANDLER, JR., OF SOUTHWARK, ENGLAND.

IMPROVEMENT IN APPARATUS FOR CONDENSING, WASHING, AND PURIFYING GAS AND OTHER VAPORS.

Specification forming part of Letters Patent No. 206,736, dated August 6, 1878; application filed May 17, 1878; patented in England December 29, 1877.

*To all whom it may concern:*

Be it known that we, THOMAS NESHAM KIRKHAM, of Abingdon street, Westminster, DAVID HULETT, of High Holborn, London, in the county of Middlesex, and SAMUEL CHANDLER, Sr., and SAMUEL CHANDLER, Jr., both of Newington Causeway, Southwark, in the county of Surrey, all in the Kingdom of England, have invented Improvements in Apparatus for Condensing, Washing, and Purifying Gas and other Vapors, of which the following is a specification:

Our said invention relates more particularly to condensing, washing, and absorbing impurities from coal-gas, but is equally applicable to the treatment of other gases and vapors, such, for example, as the condensing and absorbing of ammonia, sulphurous-acid gas, and hydrochloric-acid gas; and it consists of a simple and compact arrangement of apparatus containing a number of annular plates or disks of metal or other suitable material, and of any desired shape, partially immersed, and caused to rotate in water or other suitable liquid or solutions, for the purpose of maintaining them in a wet condition.

The vessel is divided into compartments for containing the liquid by partitions, having openings at their center, and having attached thereto, at various heights, plates to partially cover said perforations and regulate the height of said chambers for containing varying quantities of liquid. A shaft runs horizontally through the vessel, and has keyed thereon perforated plates or bosses, bearing at their peripheries against the partitions dividing the vessel, a number of disks, corresponding to the number of compartments, being also keyed upon the shaft and bolted or otherwise secured to the annular plates.

The gases or other vapors to be treated in their passage through the apparatus are caused to travel over and impinge against the surfaces of the annular plates, whereby the condensation and absorption or purification of the gases or vapors are more rapidly effected, in a minimum amount of space, than heretofore.

And in order that our said invention may be clearly understood we shall now proceed more particularly to describe the same, and for that purpose shall refer to the accompanying sheet of drawings, of which—

Figure 2:
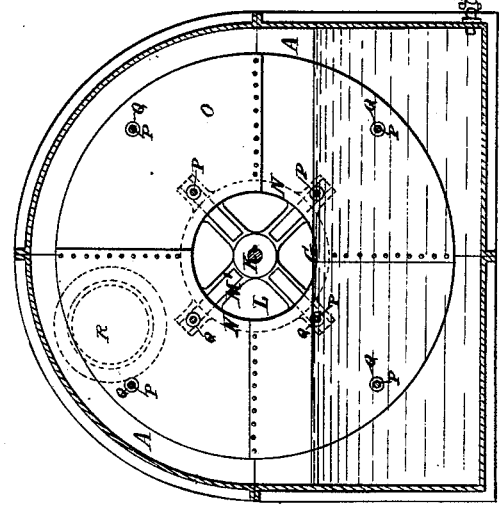
Figure 1:
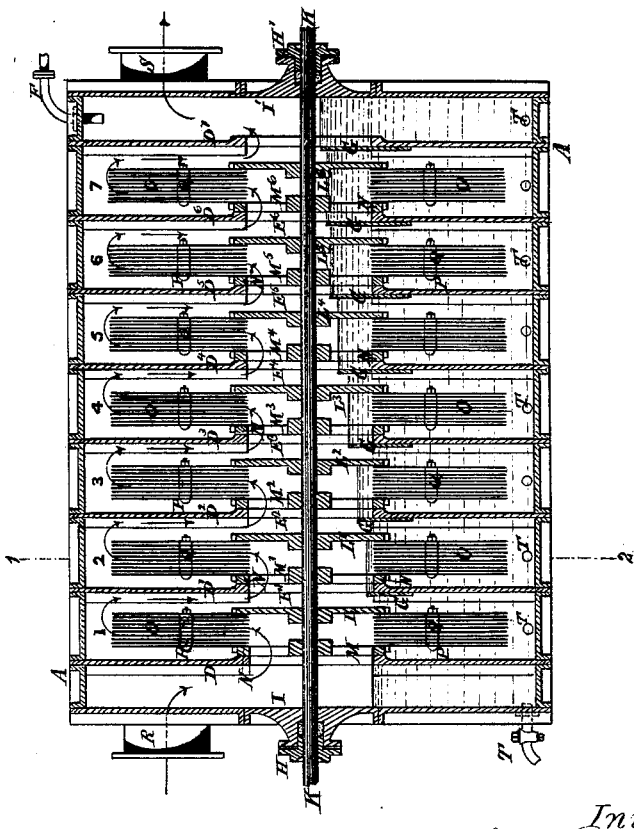

Figure 1 represents a longitudinal section of an apparatus constructed according to our said invention, and Fig. 2 is a transverse section of the same, taken along the line 1 2 in Fig. 1.

A is a cast-iron vessel, which may be made of any required size and shape, and divided by means of partitions $D\ D^1\ D^2\ D^3\ D^4\ D^5\ D^6\ D^7$, and so on, into any desired number of chambers, according to the length of the vessel, seven being shown in our drawings, numbered, respectively, 1 2 3 4 5 6 7. These chambers, which communicate with each other through openings $E^1\ E^2\ E^3\ E^4\ E^5\ E^6$ in the center of the partitions, contain water or suitable liquid for effecting the purification of the gas or absorption of gases, as may be required, which liquid is admitted to the interior of the vessel A through a supply-pipe, F, and flows thence through the said openings into the several chambers 7 6 5 4 3 2 1, the level of the liquid in the chambers gradually decreasing in height from chamber 7 to chamber 1, the height thereof being regulated as required by means of plates G secured to the partitions $D^1\ D^2\ D^3\ D^4\ D^5\ D^6\ D^7$, so as to cover more or less the openings in the said partitions. Through the center of the vessel A, and through stuffing-boxes H H' in the ends I I', is passed a horizontal shaft, K, upon which shaft, at a short distance from the partitions, are keyed a number of disks, $L\ L^1\ L^2\ L^3\ L^4\ L^5\ L^6$, corresponding with the number of chambers contained in the vessel. A similar number of perforated plates or bosses, $M\ M^1\ M^2\ M^3\ M^4\ M^5\ M^6$, are also keyed upon the shaft K, so as to bear at their peripheries N against their adjacent partitions. Between each of the disks L and bosses M are arranged, in clusters, any desired number of annular plates, O, of thin metal or other suitable material, which are connected together and to the said disks and bosses by bolts P, or in any other suitable manner, distance-pieces or washers Q being interposed between the several annular plates, in order to maintain them at a short distance apart, to admit of the passage between them of the gases or other vapors to be treated, as hereinafter described. These clusters of annular plates, which are so arranged upon the shaft K as that each of the chambers shall contain one of such clusters, are caused to rotate in the liquid contained in the said chambers by means of a driving-strap gearing, or otherwise, from any suitable prime mover.

The gases or other vapors to be treated, which are admitted into the vessel A through the pipe R, enter the first chamber of the series through the opening in the partition D, whence they pass up between and over the edges or outer peripheries of the cluster of annular plates O contained therein, thence through the opening $E^1$ in the next partition D and the perforations in the boss M into the chamber 2. They then travel up between and over the edges or outer peripheries of the cluster of annular plates contained in the said second chamber, and through the openings $E^2$ in the partition $D^2$ and the perforations in the boss $M^2$ into the next chamber 3, and so on in succession through the other chambers, 4, 5, 6, and 7, to the opposite end of the vessel, and finally escape therefrom through the outlet-pipe S.

It will thus be seen that the gases or other vapors, in their passage through the apparatus, are caused to travel in a zigzag or circuitous direction, as indicated by the arrows in Fig. 1, over and in contact with the surfaces of the annular plates or disks O, which plates, by being caused to rotate in liquid in the manner hereinbefore described, thoroughly saturate the said gases and effect their condensation, while the impurities contained therein are absorbed or taken up by the said liquid or solutions, which thus become rich with ammonia and other valuable properties, and may be discharged from the chambers, as required, through the cocks or valves T.

If desired, the direction in which the gases or vapors are caused to travel over the annular plates may be reversed—that is to say, in lieu of causing them to enter at the center of the plates and pass between them toward their outer peripheries, as hereinbefore described, they may be made to enter at the outer peripheries and pass out at their centers into the next chambers. This may be effected either by transposing the positions upon the shaft K of the disks L and bosses M, (the latter being still made to bear against their respective adjacent partitions,) or by admitting the gases into the vessel A through the pipe S, and causing them to travel in the reverse direction to that indicated by the arrows in Fig. 1 to the opposite end of the vessel, and pass out through the pipe R. In this latter case the level of the liquid in the chambers should decrease in height from chamber 1 to chamber 7.

We claim—

1. The annular plates O, arranged in clusters between disks L and bosses M, secured to the shaft K, to revolve within each compartment or chamber, in combination with the partitions D, against which the said bosses M bear, as set forth.

2. The vessel A, divided into compartments by partitions D, having central openings, plates G being secured to said partitions at varying heights to regulate the depth of the compartments, substantially as set forth.

In witness whereof we have signed our names to this specification in the presence of two subscribing witnesses.

T. N. KIRKHAM.
    D. HULETT.
    S. CHANDLER, Sr.
    S. CHANDLER, Jr.

Witnesses:
 WILLIAM DEARLE,
   14 Medburn St., London N. W.
 JNO. HERSEY,
   22 Upper Park Road,
    Hampstead, London N. W.